US011234802B2

(12) United States Patent
Ng et al.

(10) Patent No.: US 11,234,802 B2
(45) Date of Patent: Feb. 1, 2022

(54) TOOTHBRUSH

(71) Applicant: THE UNIVERSITY OF HONG KONG, Hong Kong (CN)

(72) Inventors: Tze Chuen Ng, Hong Kong (CN); Lijian Jin, Hong Kong (CN)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 252 days.

(21) Appl. No.: 16/483,324

(22) PCT Filed: Feb. 2, 2018

(86) PCT No.: PCT/CN2018/075090
§ 371 (c)(1),
(2) Date: Aug. 2, 2019

(87) PCT Pub. No.: WO2018/141264
PCT Pub. Date: Aug. 9, 2018

(65) Prior Publication Data
US 2020/0008913 A1     Jan. 9, 2020

Related U.S. Application Data

(60) Provisional application No. 62/454,427, filed on Feb. 3, 2017.

(51) Int. Cl.
*A61C 17/20* (2006.01)
*A46B 7/06* (2006.01)
(Continued)

(52) U.S. Cl.
CPC ............... *A61C 17/20* (2013.01); *A46B 7/06* (2013.01); *A46B 9/045* (2013.01); *A46B 9/06* (2013.01);
(Continued)

(58) Field of Classification Search
CPC .......... A61C 17/20; A46B 7/06; A46B 9/045; A46B 9/06; A46B 13/023
See application file for complete search history.

(56) References Cited

U.S. PATENT DOCUMENTS 4,223,417 A * 9/1980 Solow ..................... A46B 9/12
                                                                                         15/22.1
5,072,481 A    12/1991   Weyer
(Continued)

FOREIGN PATENT DOCUMENTS

CN            1450881 A      10/2003
CN         200966435 Y      10/2007
(Continued)

OTHER PUBLICATIONS

International Search Report and Written Opinion in corresponding PCT Application No. PCT/CN2018/075090, dated Apr. 18, 2018.

*Primary Examiner* — Shay Karls
(74) *Attorney, Agent, or Firm* — Leason Ellis LLP

(57) ABSTRACT

A toothbrush includes a head with a new design and a handle that operates to move the head. The toothbrush head has multiple types of purpose-designed bristle-bundles precisely mapped to target specifically all dental-gingival surfaces and anatomically niches, including various dead-corner niches/surfaces that are usually not accessible by currently existing toothbrushes. Each cluster of bristle-bundles contains bristles of different sizes, diameters, hardness, lengths, angulations and colors. The head is designed to be inclined to accommodate both lingual and palatal surfaces. This toothbrush head also functions uniquely by coupling over dental arches and rotating so that the brush does not need to be lifted during movement from one end to the other. Further, moving the handle with respect to the brush head causes the (Continued)

width of the brush head to change to accommodate the different widths of the teeth along the dental arch.

18 Claims, 13 Drawing Sheets

(51) Int. Cl.
    *A46B 9/04*     (2006.01)
    *A46B 9/06*     (2006.01)
    *A46B 13/02*     (2006.01)

(52) U.S. Cl.
    CPC .... *A46B 13/023* (2013.01); *A46B 2200/1066* (2013.01)

(56) References Cited

U.S. PATENT DOCUMENTS

| | | |
|---|---|---|
| 6,381,794 B1 | 5/2002 | Porper et al. |
| D585,648 S | 2/2009 | Hegemann et al. |
| 7,757,329 B2 | 7/2010 | Hegemann et al. |
| 7,774,885 B2 * | 8/2010 | Kressner ................ A61C 17/34 15/22.1 |
| 2004/0088806 A1 | 5/2004 | DePuydt et al. |
| 2011/0113576 A1 | 5/2011 | Yankell |
| 2011/0308024 A1 | 12/2011 | Hegemann |
| 2011/0314622 A1 | 12/2011 | Hong |

FOREIGN PATENT DOCUMENTS

| | | | |
|---|---|---|---|
| CN | 2013/23994 Y | 10/2009 | |
| CN | 105853006 A | 8/2016 | |
| EP | 0611282 B1 | 8/1999 | |
| WO | WO-9403085 A2 * | 2/1994 | ............. A46D 1/00 |
| WO | WO-2019026020 A1 * | 2/2019 | ........... A46B 5/0091 |

* cited by examiner

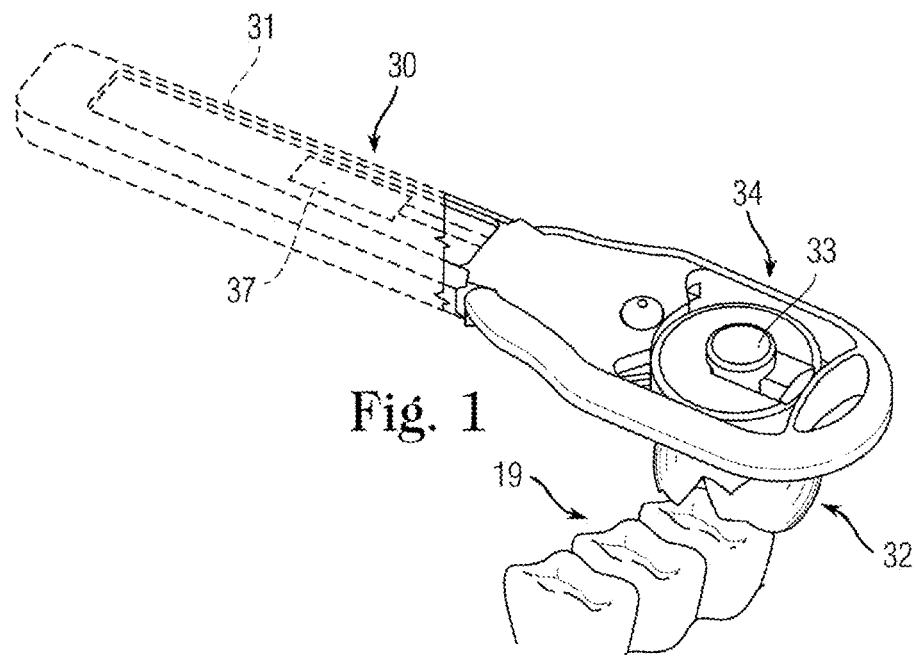
Fig. 1
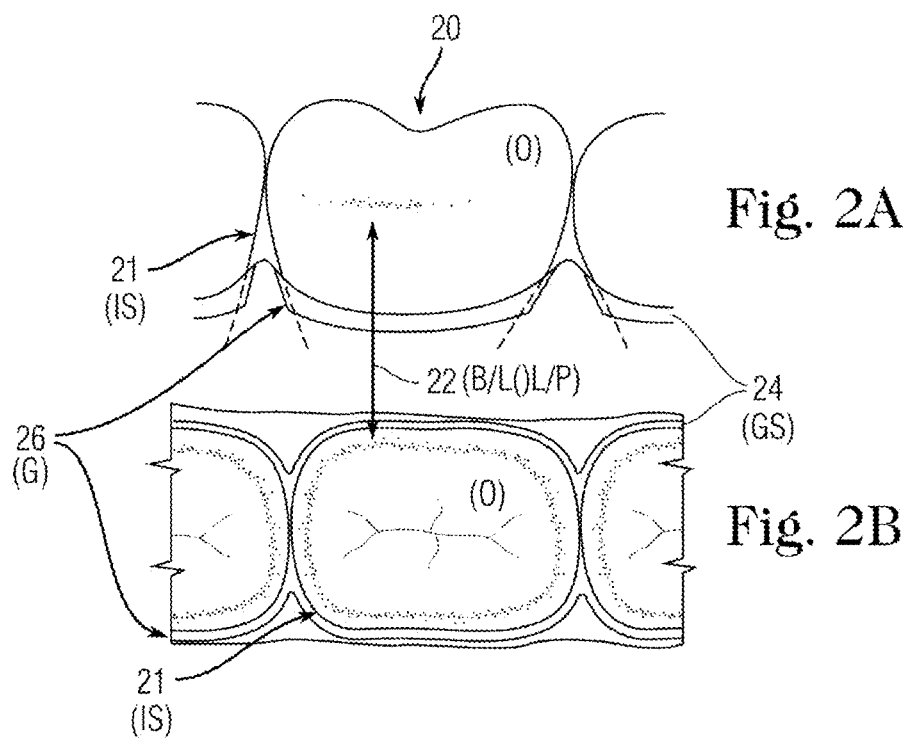
Fig. 2A
Fig. 2B

HARD
X20
SOFT
X20
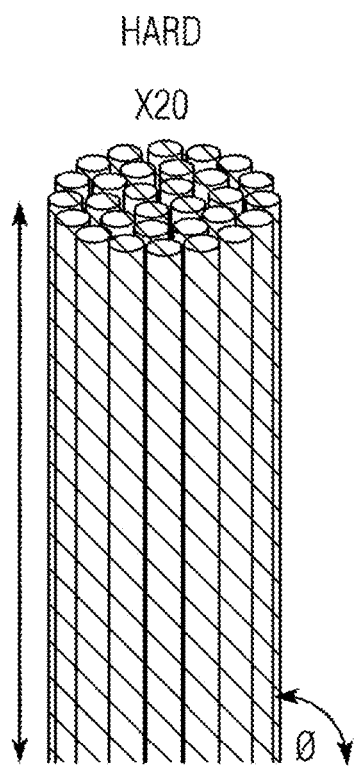
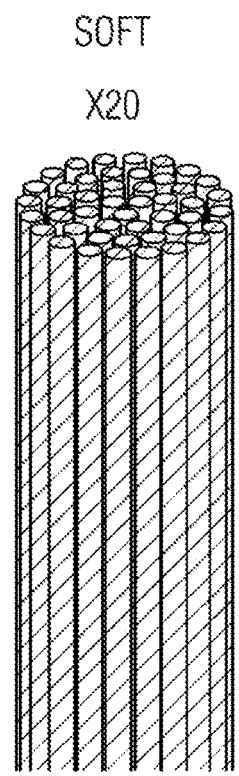
Fig. 6A      Fig. 6B
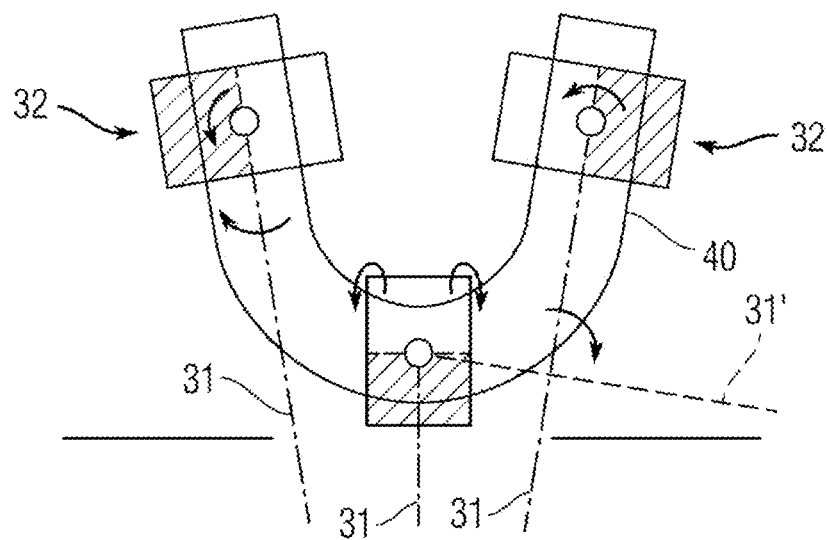
Fig. 7

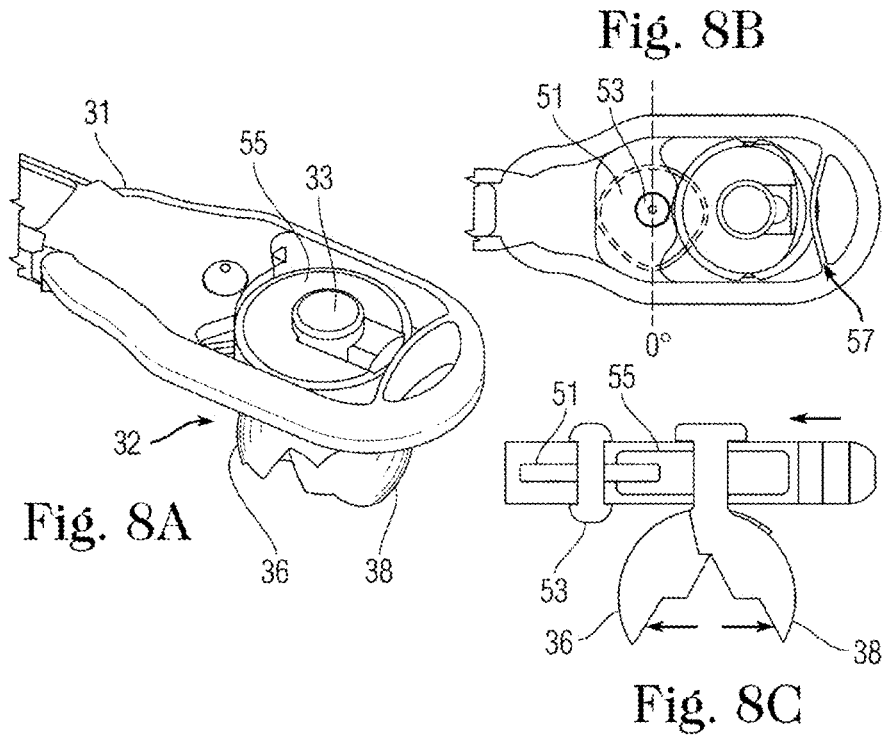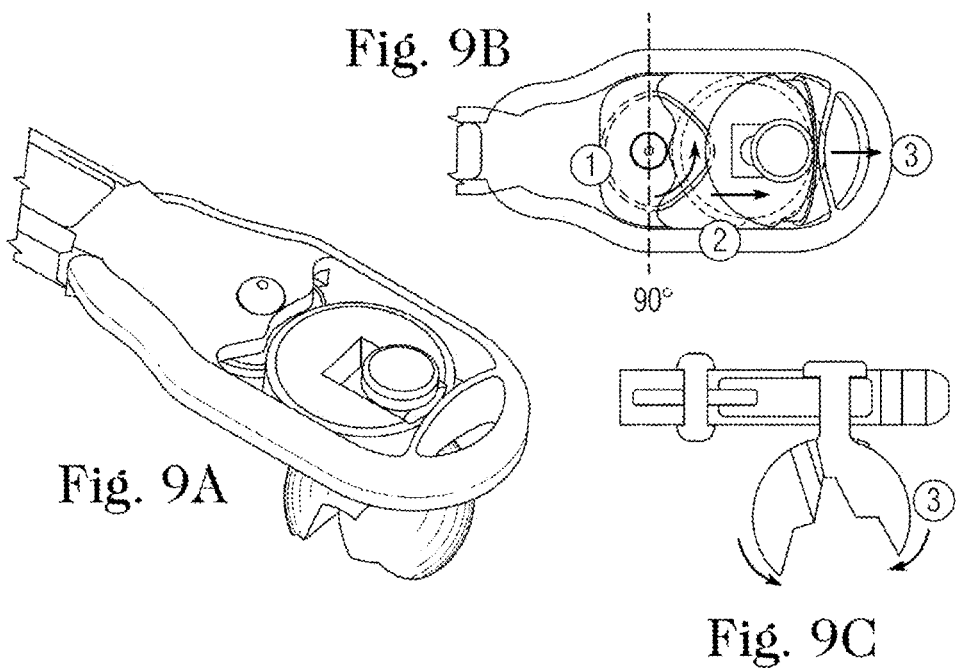

ized and essential
TOOTHBRUSH

CROSS-REFERENCE TO RELATED PATENT APPLICATIONS

This application is a U.S. National Phase Application under 35 U.S.C. § 371 of International Patent Application No. PCT/CN2018/075090, filed Feb. 2, 2018, and claims the benefit of priority under 35 U.S.C. Section 119(e) of U.S. Application Ser. No. 62/454,427, filed Feb. 3, 2017, which are incorporated herein by reference in their entireties. The International Application was published on Aug. 9, 2018 as International Publication No. WO/2018/141264 A1.

FIELD OF THE INVENTION

The present invention relates to toothbrushes and more particularly to toothbrushes designed to help users brush in a most effective way.

BACKGROUND OF THE INVENTION

A toothbrush is an oral care product that every person should use daily. In fact, it is the most common and essential oral hygiene aid for oral health and general wellbeing. Effective tooth brushing is therefore a must in everyone's daily life worldwide, as a way to clean the teeth by removal of dental plaque biofilms. It is evident that uncontrolled plaque biofilms critically account for the onset and development of the most common oral diseases in humans (i.e. decay/caries and gum/periodontal disease).

However, brushing in the wrong way can lead to periodontal (gum) diseases, as opposed to preventing them, and most people brush their teeth in the wrong way, i.e., in such a way that plague along the teeth and gums is not removed properly. Therefore, this dental plague along the teeth and gum, if not controlled, causes gum disease. When periodontal disease becomes severe, it will cause permanent tooth loss, and the process is irreversible. Indeed, severe gum disease is the major cause of multiple tooth loss in adults worldwide.

The toothbrush usually includes a head with rows of bristles and an appropriate handle. Over the years, there have been various attempts to upgrade and refine the forms of classical toothbrushes to facilitate users' brushing action. For example, toothbrushes with three bristle surfaces directed to the top and both sides of the tooth are disclosed in China patent No. 2013/23994Y, European Patent 0611282 B1, US Published Application US20110113576 and U.S. Pat. No. 5,072,481. See also US Design Pat. D585,648, U.S. Pat. No. 7,757,329 and US Published Application No. 2011/0308024. These attempts have often been inappropriately undertaken by the public. A major limitation of these prior toothbrushes is a lack of precisely purpose-designed bristle-bundles that specifically target all dental-gingival surfaces and niches.

Therefore, various other oral hygiene aids, such as dental floss, interdental brushes and single-head brushes have been developed and widely utilized to make up for the deficiencies in prior and current toothbrushes. It is obvious that an ideal toothbrush could, to a great extent, function to effectively control plaque biofilms at the tooth/gum line and at dead-corners and niches in the surfaces of the teeth, so as to eliminate the need for these hygiene aids.

SUMMARY OF THE INVENTION

The present invention (the "NJ toothbrush") provides advantageous toothbrush that is uniquely designed to overly target dental surfaces and in particular the inter-dental, posterior and under the gum line surfaces (so called 'dead-corner' niches) where the currently used toothbrushes are unable to effectively clean.

In an illustrative embodiment of the invention the toothbrush is designed using a precise computer-mapping of six types of purpose-designed and made bristle-bundles targeting all dental-gingival surfaces and niches. It can therefore maximize the effective control of plaque biofilms and oral/periodontal inflammation. Moreover, this toothbrush is very user-friendly because of a purpose-built "rail track" approach to facilitating the appropriate action of brushing the teeth so as to promote optimal oral and general health.

The six types of computer-mapped purpose-designed bristle-bundles allow specific clusters of bristle-bundles to simultaneously clean the occlusal surface, interdental space, buccal/labial (low jaw) or lingual/palatal (upper jaw) surfaces, sub-gingival niches, the surface of gingival margin, and the distal surface of molars. Each group of these bristle-bundles have purpose-designed sizes, diameters, harnesses, lengths, angulations and colors, in order to maximize the cleaning efficacy and minimize the traumatic effects on tooth and gingival tissues.

Appropriate tooth brushing technique is crucial for removal of plaque biofilms. The novel toothbrush of the present invention is designed to be very user-friendly with respect to guiding the proper brushing technique through the guiding rail track that couples over both upper and lower dental arches. As it is moved along the dental arch the brush head rotates automatically from one to the other side by a 360 degree rotation of the handle. In addition, the brush head is specially designed to be inclined automatically to accommodate both lingual and palatal surfaces of the upper and lower canines and incisors. The novel toothbrush can brush all faces of a tooth at the same time. This makes daily tooth brushing an easy, effective and enjoyable activity for optimal oral/periodontal health and general wellbeing.

BRIEF DESCRIPTION OF THE DRAWINGS

The foregoing and other objects and advantages of the present invention will become more apparent when considered in connection with the following detailed description and appended drawings in which like designations denote like elements in the various views, and wherein:

FIG. 1 is a prospective view of a toothbrush according to an exemplary embodiment of the present invention;

FIGS. 2A and 2B are views of the sides and tops of a group of teeth showing the five target areas for cleaning with the toothbrush of the present invention;

FIGS. 6A and 6B illustrate the hard bristle bundle and the soft bristle bundles for use with the present invention, which bundles may each have different diameters, hardness, lengths, angulations and colors;

FIG. 7 illustrates the toothbrush according to the present invention at different positions along the dental arch showing the rail track feature of the toothbrush according to the present invention;

FIGS. 8A, 8B and 8C are, respectively, a perspective view, a plan view and a cross-sectional view of one embodiment of the coupling mechanism of the toothbrush according to the present invention in the zero (0) degree position;

FIGS. 9A, 9B and 9C are, respectively, a perspective view, a plan view and a cross-sectional view of the head of the toothbrush according to the embodiment of FIG. 8 when in the ninety (90) degree position;

DETAILED DESCRIPTION OF EXEMPLARY EMBODIMENTS OF THE INVENTION

Figure 3:
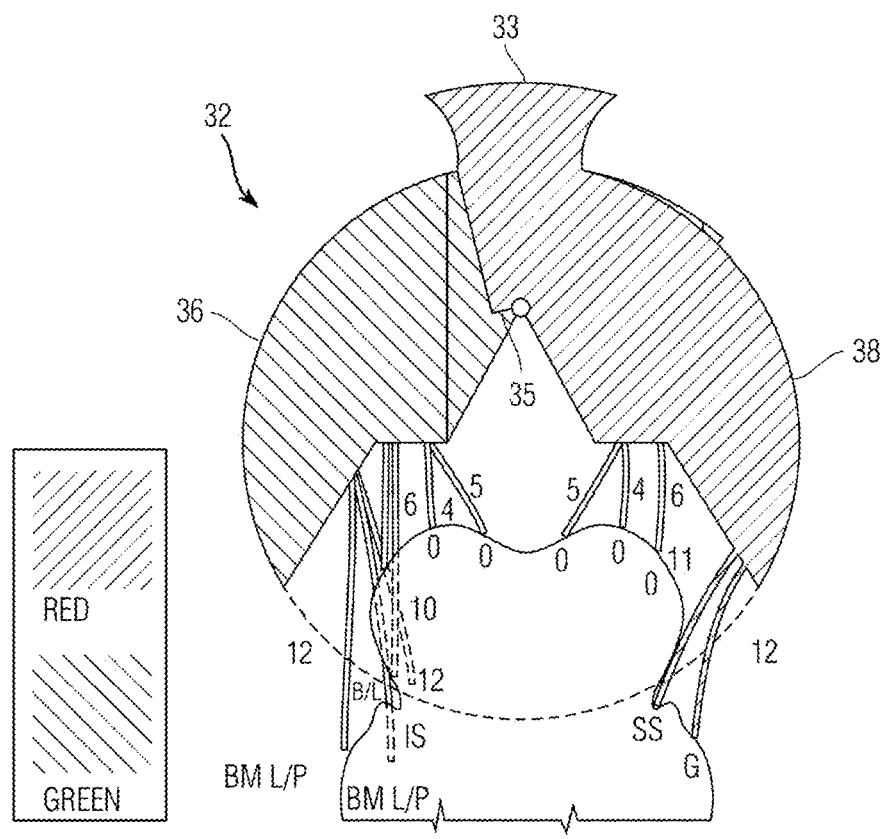
FIG. 3 is a cross sectional view of the head of the toothbrush located over a tooth and illustrating the angular positions and types of the bristle bundles utilized in a toothbrush according to the present invention, and the automatic inclination of the brush head sections.

The present invention relates to a new multi-targeting toothbrush with eco-friendly dexterity to maximize the effectiveness of plaque control for promoting optimal oral/periodontal health and oral health-related quality of life. As shown in FIG. 1 the toothbrush 30 has a flat handle 31 and a bifurcated brush head 32 that may be arranged perpendicular to the plane of the handle. The brush head 32 is connected to the handle 31 through a coupling mechanism 34 that allows the head to rotate about a pivot axle 33. If the alignment between the handle and the brush head is changed by rotating the handle about pivot 33, the two halves of the bifurcated head open and close with respect to each other. This allows the user to control amount of contact with the teeth 19 as the brush head is moved over teeth of different widths, e.g., the molars versus the incisors.

FIGS. 2A and 2B provide a side view and a top plan view of typical teeth along a dental arch in the mouth of the user. There are six specific areas of the teeth that need attention during brushing. In particular, an ideal toothbrush should target all of the dental-gingival surfaces and niches, including: 1) the occlusal surface 20 or (O), 2) the interdental spaces 21 or (IS), 3) the buccal/labial (B/L) or lingual/palatal (L/P) surfaces 22, 4) below the gum-line/sub-gingival niches or sulcus 24 or (GS), 5) the gum surface 26 or (G) and 6) even the distal surfaces or posteriors of the molars 28 or (BM) (See FIG. 4A). The typical toothbrush fails to target all of these areas and as such, there are various "dead-corner" niches/surfaces that are usually not accessed by currently available manual or electronic toothbrushes.

Notably, the toothbrush of the present invention is highly featured with several specific design features. First, the toothbrush of the present invention has different types of bristle-bundles containing different sizes, diameters, hardness, lengths, angulations and colors for achieving the highest possible efficacy of plaque control, while minimizing traumatic tooth brushing effects on both the teeth and gums. These bristles are designed by precise computer-mapping of six (6) types of these bristle bundles. Second, this novel toothbrush functions uniquely by precisely coupling over both the upper and lower dental arches as a user-friendly guided "rail track." In particular, the brush head can rotate automatically along both the upper and lower dental arches from one end to the other end by a specifically designed rotation of the handle with respect to the axis of the head.

FIG. 3 is a cross sectional view of the head 32 of the toothbrush located over a tooth 19. The head has two parts 36, 38 at least one of which can pivot axis 33 so that the gap between them can open and close as will be explained below. FIG. 3 also schematically shows six different fiber bundles (4, 5, 6 and 10, 11, 12) each of which is computer selected as to type, location and angular positioned in order to optimally target the appropriate areas of the tooth that should be contacted during brushing for total removal of dental plaque on all dental surfaces and gingival niches As indicated above, these include the occlusal surface (O), the gingival sulcus (GS), the gum or gingival (G), the interdental space (IS), the buccal/labial (B/L), the lingual/palatal (L/P) and the distal surface of the last molars (BM). The bundles 4 are directed to the occlusal (O) surfaces at nearly a right angle. The bundles 5 are directed at an angle to the central depression of the occlusal surface. Bundles 6 are directed nearly perpendicularly to the outer edges of the occlusal surface. It should be noted that these bundles 4-6 have slightly different lengths and angles to effectively reach the different parts of the occlusal surface. They are indicated as green in FIG. 3 to show that they are generally of the same type.

Figure 4A:
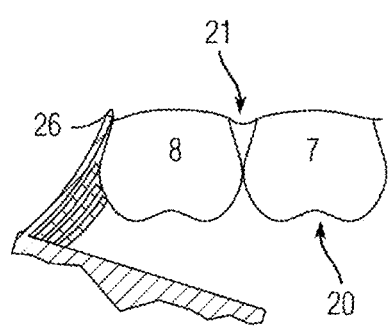
FIG. 4A is a schematic illustration of special bristle bundles of fibers targeting the distal or back side of an end molar.
Figure 4C:
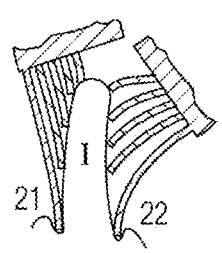
FIGS. 4B & 4C are schematic illustrations of special bundles of fibers targeting the lingual and palatal surfaces of the upper and lower incisors, respectively, according to an embodiment of the present invention.
Figure 4B:
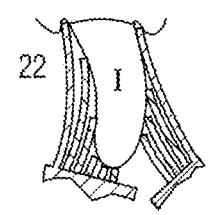

Bundles 10 are relatively long compared to the occlusal bundles so as to reach the buccal/lingual (B/L) surfaces when in contact most teeth (FIGS. 4A and 4B), but to reach the distal surface of the last molars (BM) when at the ends of the dental arch (FIG. 4A). These are shown in green as extending from portions 36 and 38 of the head. See FIG. 5A. Bundles 11 extend from portions 36 and 38 of the head and are at an angle so as to reach the gingival sulcus (GS). They are in a red color to indicate a different type of fiber. See FIG. 5A.

Bundles 12, which extend from portions 36, 38 of the head, are of two types. There are red bundles that contact the gums (G) and the interdental space (IS). There are also blue fibers that contact the buccal/palatal and lingual/palatal surfaces when on most teeth, but also contact the distal surface of that molar (BM).

Figures 5A, 5B:
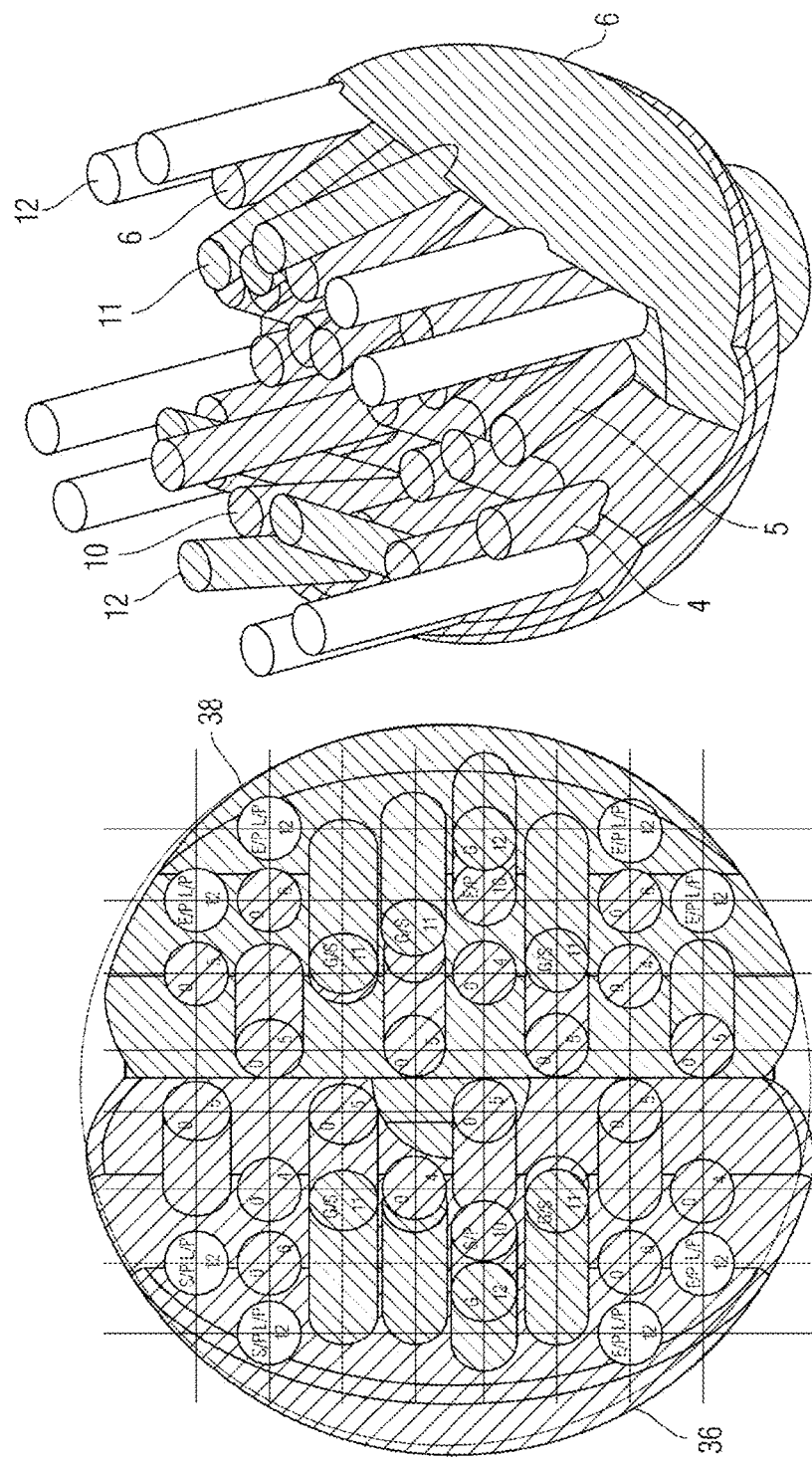
FIGS. 5A and 5B are a planar view and a perspective view of the head of a toothbrush according to the present invention showing the positioning and types of bristle bundles.

FIGS. 5A and 5B are a planar view and a perspective view of the head of a toothbrush according to the present invention showing the positioning and types of bristle bundles. The bristle bundles 4, 5 and 6 are shown as being relatively short and are colored green to indicate they are the same types of fibers. They are present at mirror locations on portions 36 and 38 of the head. Additionally, fibers 10 as somewhat longer, but are also in green and extend from portions 36 and 38. Bundles 11 are longer than bundles 10 and are in red color to show they represent different fibers. There are also red bundles 12 and blue bundles 12. FIG. 5A best shows the locations of the various bundles and FIG. 5B best shows the angles for each.

Each type of bristle-bundle contains fibers of various diameters, hardness, length, angulation and color. As indicated above, the special bristle-bundles (the blue bundles) target the distal surfaces of the upper and lower end molars, and the lingual & palatal surfaces of the upper and lower incisors. FIGS. 6A and 6B show the parameters for the individual green and red bundles. For example, the green or hard bundle has 20 fibers, while the red or soft bundle has 30 fibers. Because the red fibers are smaller in diameter than the green fibers, each bundle is still approximately the same diameter, e.g., 1-1.2 mm. The special bristle-bundles concerned above (i.e. the blue bundles 12) consist of the hard bundle.

The method for determining the placement, type and angulation of bristle bundles is evident from FIGS. 3 and 5. In particular a model of the brush head is input to a computer graphic system. Then models of teeth along a dental arch are superimposed in the image of the model. The model is placed in the image at a typical brushing distance from the teeth. The gap between brush head portions is adjusted for the particular tooth under consideration. Then measurements are made to the various parts of the occlusal surface to determine the lengths of fiber bundles 4-6. Similar measurements are made to the buccal/lingual surfaces, the gingival sulcus and the gum line for fiber bundles 10-12. A special measurement is made for some of bundle 12 so as to the distal surface of the last molar when in position over that molar.

As the image is viewed at other locations along the dental arch and additional measurements are made, either an average value is chosen or additional bundles are selected to assure complete coverage.

The toothbrush of the present invention functions uniquely by precisely coupling over either the upper or lower dental arches. As shown in FIG. 7 it can be moved along a dental arch 40, where the arch acts as a user-friendly guide "rail track." The brush head can rotate automatically along the dental arch from one side to the opposite side by a free rotation of the handle. Beginning at the back molar on the left in FIG. 7, the head 32 straddles the molar and the handle is nearly perpendicular to the head. In this position the portions of the head 36, 38 are widely separated to accommodate the width of the molar. Also, the fiber bundles 12 can reach the distal surfaces of the last molar. In a second position shown in FIG. 7, the head and handle have rotated, with the head rotating in a counterclockwise direction as shown by the arrow and the handle rotating in the clockwise direction so it is aligned with the head. The change in the relative positions of the head and handle causes the portions of the head to close upon one another to accommodate the decreased width of the incisor teeth at the front of the mouth. If the handle had not rotated with respect to the head, so that at the second position the handle 31' is as shown in dotted line, the portions of the head would have remained far apart.

At the last position shown on the right in FIG. 7, the brush head has continued to rotate in the counterclockwise direction, but in this move the handle also moves in the counterclockwise direction. The result is to cause the portions of the head to again separate to accommodate the widths of the back molars. It should be noted that in the typical toothbrush, once the front incisors are reached moving from the back molars, the brush is lifted from the teeth and rotated before being returned to the teeth to complete the brushing of the other half of the dental arch. With the design of the present invention, there is no need to lift the head from the teeth. Instead the complete dental arch 40 can be covered and the head of the brush rotates to achieve this new function. The position of the handle with respect to the head changes the opening between the head portions to accommodate the different widths of the teeth.

This novel toothbrush can clean all surfaces of the teeth and the underlying gum line at the same time, and the unique mapping design of the bristle bundles allows the targeted bristles to contact the teeth in a way that is highly effective for daily plaque control.

The toothbrush can be a manual one or it can be powered by an ultrasonic vibrator 37 located in the handle and shown in dotted line in FIG. 1. This device vibrates the entire brush head at about 3,000 vibrations per second. The anticipated on-target bristle contact rate is over 3 million hits per second (i.e., 1,000 bristles and 3,000 vibrations per second).

FIGS. 8 and 9 provide an exemplary embodiment of the coupling mechanism 34 which causes the opening and closing of the head portions 36, 38. FIG. 8A is a perspective view of the coupling mechanism showing the handle 31, the pivot axis 33 and the portions 36, 38 of the brush head 32. FIGS. 8B and 8C show that a top plan view partially broken away and a cross-sectional view of the coupling mechanism These views reveal that the pivot axle is captured by a slotted disk 55 which engages with a cam 51 that rotates on an axle in the form of a rivet 53. While the cam 51 engages one side of the disk 55, its other side is engaged by a spring 57 in the form of a band of flexible material. FIG. 8 represents zero degrees of mechanical movement or the position in which portions 36, 38 have their widest separation.

As shown in FIG. 9, movement of the handle 31 causes cam 51 to rotate about axle 53 via a gear setting. As a result a high point on the cam pushes against the disk 55 (Position 1 in FIG. 9B). This causes disk 55 to move to the right in FIG. 9B, which in turn causes it to compress spring 57 (Step 2 in FIG. 9B). Comparing FIGS. 8A and 9A, it can be seen that this causes the pivot axle 33 to slide in the slot provided in disk 55. This sliding movement causes the brush head portion 36 to pivot toward portion 38 to close the gap between them (Step 3 in FIG. 9B), as the brush moves along the dental arch, thus accommodating various widths of teeth. As such, teeth with various widths prevent the rotation of portion 36 beyond the tooth surface, thus making a perfect fit.

Figure 10A:
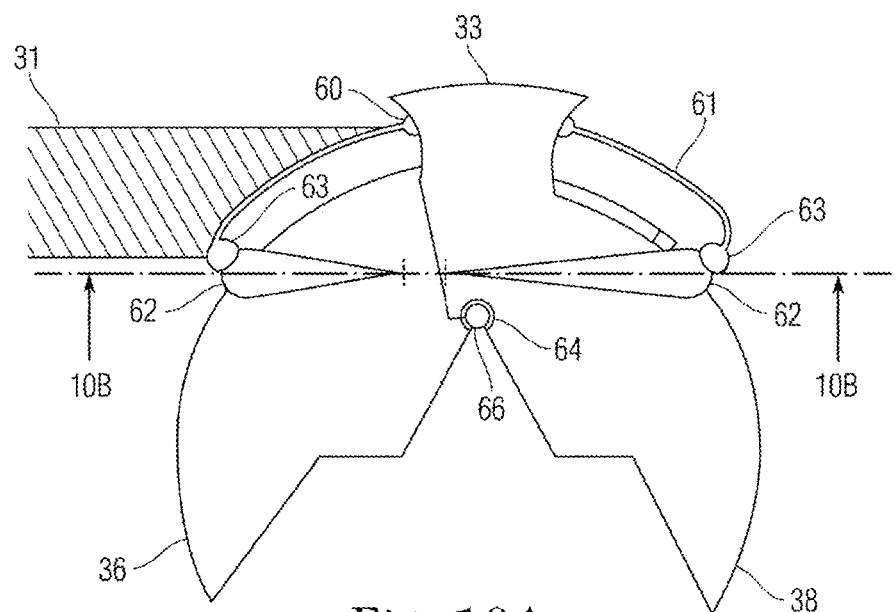
FIGS. 10A and 10B provide a side view and a cross-sectional view of another embodiment of the coupling mechanism that causes both portions of the brush head to open or close with relative movement of the handle.
Figure 10B:
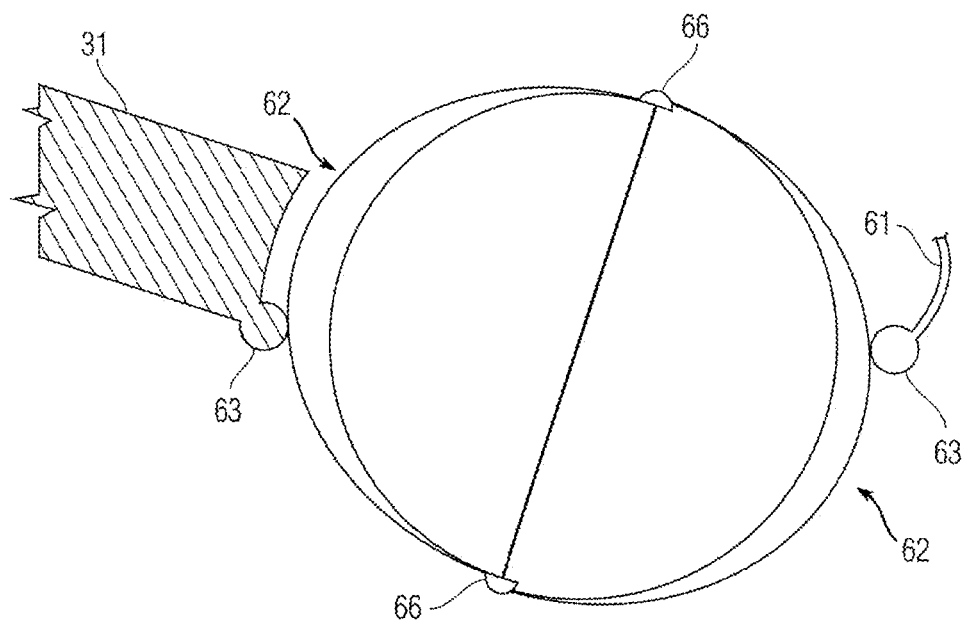

FIGS. 10A and 10B show in schematic form an alternative arrangement for the coupling mechanism 34 which causes both brush head portions 36, 38 to move toward each other. In FIG. 10A, a joint 60 is provided at the end of the handle 31 on the axle 33. This joint allows the brush head portions 36 and 38 to freely rotate about axle 33. There are ellipse-like convex shapes 62 located on each of the head portions 36, 38, respectively. The shapes 62 are engaged by ends 63 of clamping arms 61 that are rigidly attached to handle 31. The ends 63, by engaging varying heights of the convex shapes 62 as the handle turns with respect to the heads, provides a variable force to open and close the gap between the brush head portions 36 and 38 against the force of a coil spring 64.

FIG. 10B is a cross-sectional illustration at the level of the dotted line in FIG. 10A. When brushing the incisor teeth, the handle is positioned as illustrated. The end 63 of the clamping arm 61 of the handle 31 will meet the outer surface of the ellipse 62 and provide a force to close the gap between the brush head portions against spring 64 as they pivot about axis 66. When brushing from the incisors to the molars, the handle is gradually turned, which allows the gap to gradually push outward and become wider.

Figure 11A:
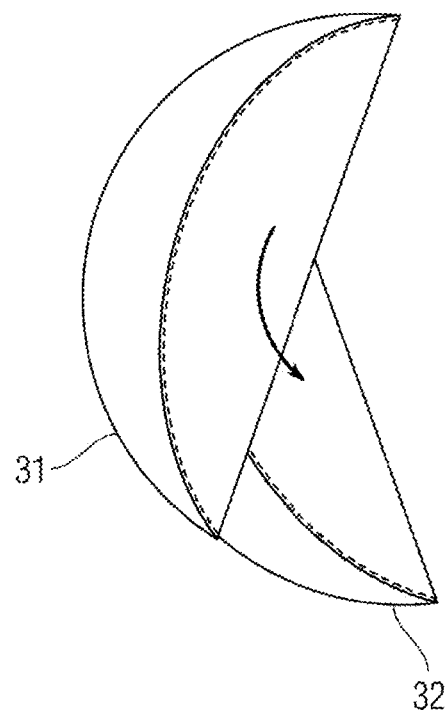
FIGS. 11A and 11B show a top plan view and a cross-sectional view of still another embodiment of the coupling mechanism of the present invention with cam surfaces of the toothbrush handle that cause the half portions of the brush head to automatically vary their angular relationship to each other in response to movement of the handle.
Figure 11B:
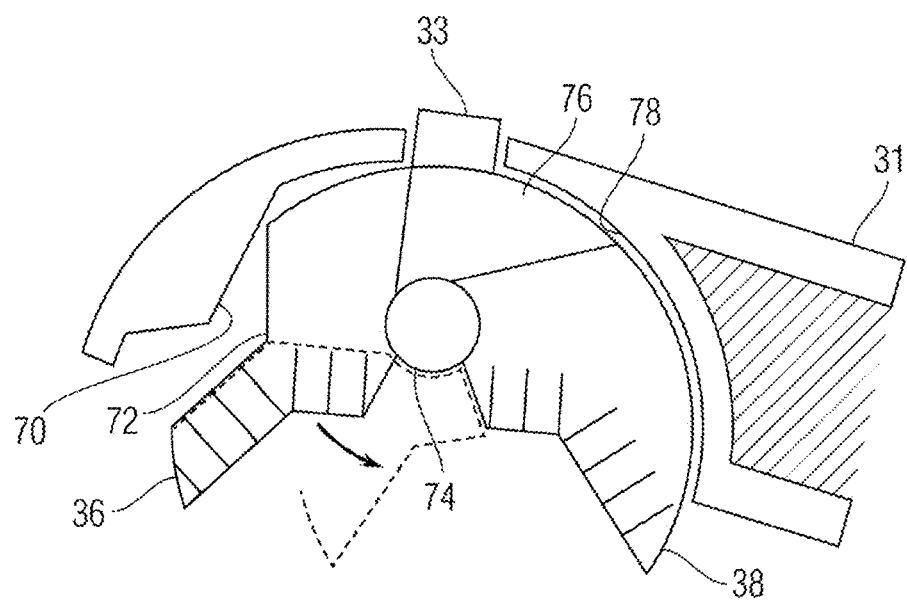

FIGS. 11A and 11B show in schematic form a still further embodiment of an alternative arrangement for the coupling mechanism 34. FIG. 11A shows a portion of the handle 31 engaging directly a portion of the brush head 36. These surfaces are elliptical cam surfaces that are shaped such that a gradual rotation of the handle with respect to the brush head portion causes a gradual pivoting of the brush head portion 36 to bring about an opening or closing of the gap between the brush head portions.

FIG. 11B is a cross-sectional view to the coupling mechanism with the handle 31 capturing the pivot axle 33. The brush head portions 36, 38 are suspended from the pivot axle. These portions can pivot about a point 74, but are biased outwardly by a leaf spring 76. The interior surface of the handle 31 is provided with the elliptical cam surface 70 that engages with the elliptical cam surface 72 of the portion 36. As the handle is rotated about the axle 33, the contact between these surfaces causes the handle surface 70 to push on the brush portion 72 so as to force it inwardly as shown in dotted line against the force of the spring 76.

As shown in FIG. 11B, only the brush head portion 36 moves. However, if the portion 38 were also provided with a cam surface that engaged another cam surface on the interior of the handle at location 78, both portions could be made to move toward and away from each other. Thus, FIG. 11 shows additionally that the "NJ toothbrush" can accommodate the longitudinal axial of the brush-head on tooth as a "passive self-adaptive" device, and it has a self-correction angle.

Figure 12:
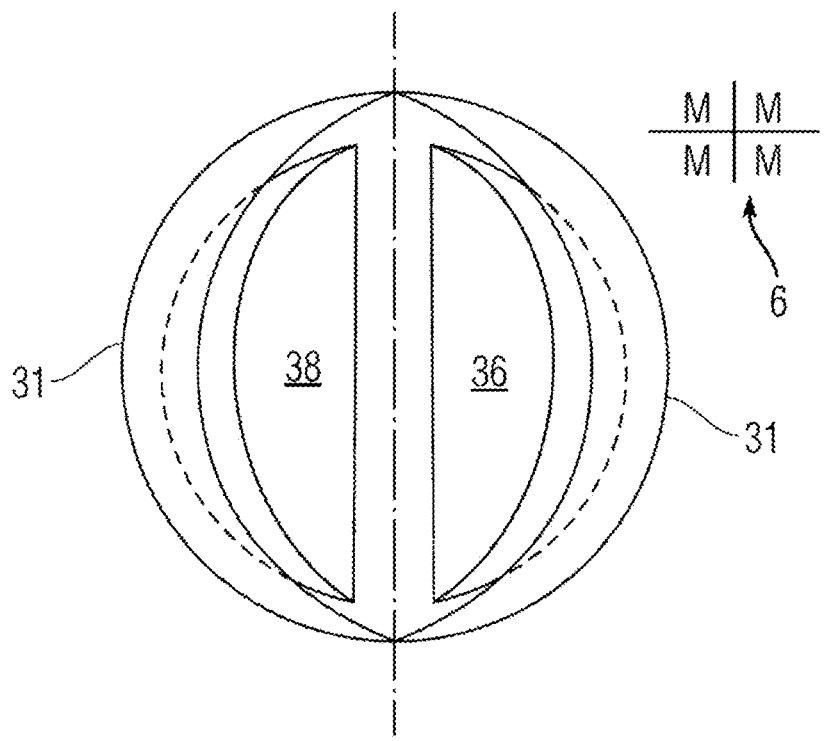
FIG. 12 shows the full open mode when the toothbrush of the present invention is targeting molars.
Figure 13:
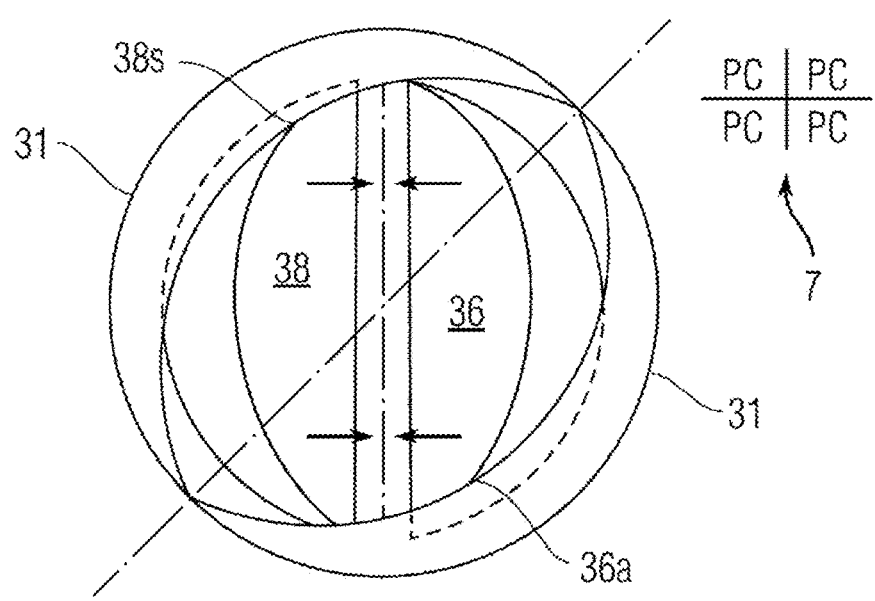
FIG. 13 shows the partial closure mode when the toothbrush according to the present invention is targeting premolar and canine teeth.
Figure 14:
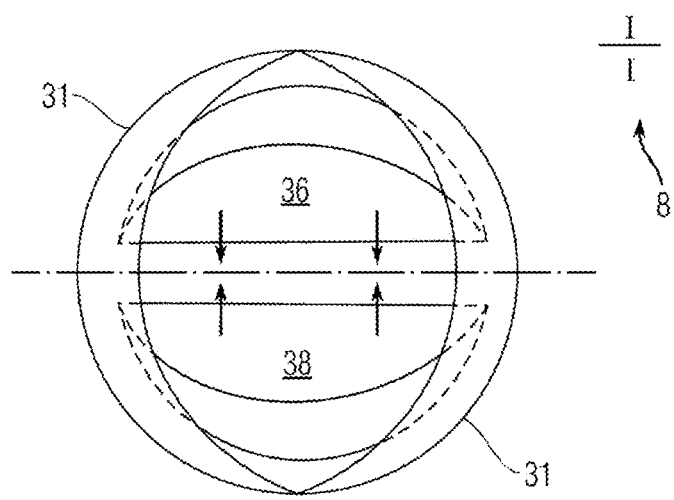
FIG. 14 shows the full closure mode when the toothbrush according to the present invention is targeting incisor teeth.

Regardless of the coupling mechanism used, the present invention provides means for the brush head portions to change the gap between them to accommodate the width of the particular teeth being contacted. FIG. 12 illustrates the full open mode when the toothbrush is targeting molars. A generally elliptical opening is provided in handle 31 and it rests against the outer surfaces of head portions 36, 38. FIG. 13 shows the handle rotated by 45 degrees with respect to the head portions. This causes a portion of the elliptical opening to engage the outer surface of the head portions, e.g., at 36a and 38a. The effect is the partial closure mode of the gap between the head portions when the toothbrush is targeting premolar and canine teeth. In FIG. 14 the handle is at ninety degrees with respect to the heads. This is the closure mode when the toothbrush is targeting the incisors.

FIGS. 15-18 are schematic illustrations of a toothbrush of the present invention including a brush head and a coupling mechanism. Hereinafter only the difference(s) of the toothbrush in the present embodiment will be described in details. For simplicity, elements, structures, configurations and/or connections of the toothbrush of this embodiment, which are common to those in the embodiments disclosed in the foregoing description, are not described in detail in the following description. Reference to such elements, structures, configurations and/or connections may be made to the foregoing description.

Figure 15:
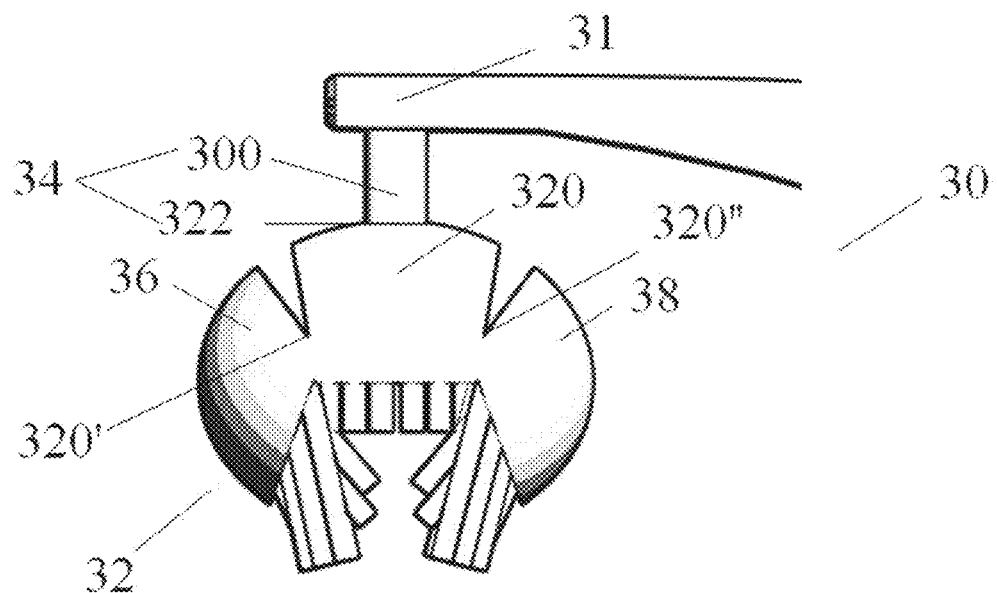
FIG. 15 is a side view of a toothbrush in a default, closed configuration of the present invention, including a brush head and a coupling mechanism according to another exemplary embodiment of the present invention.
Figure 16:
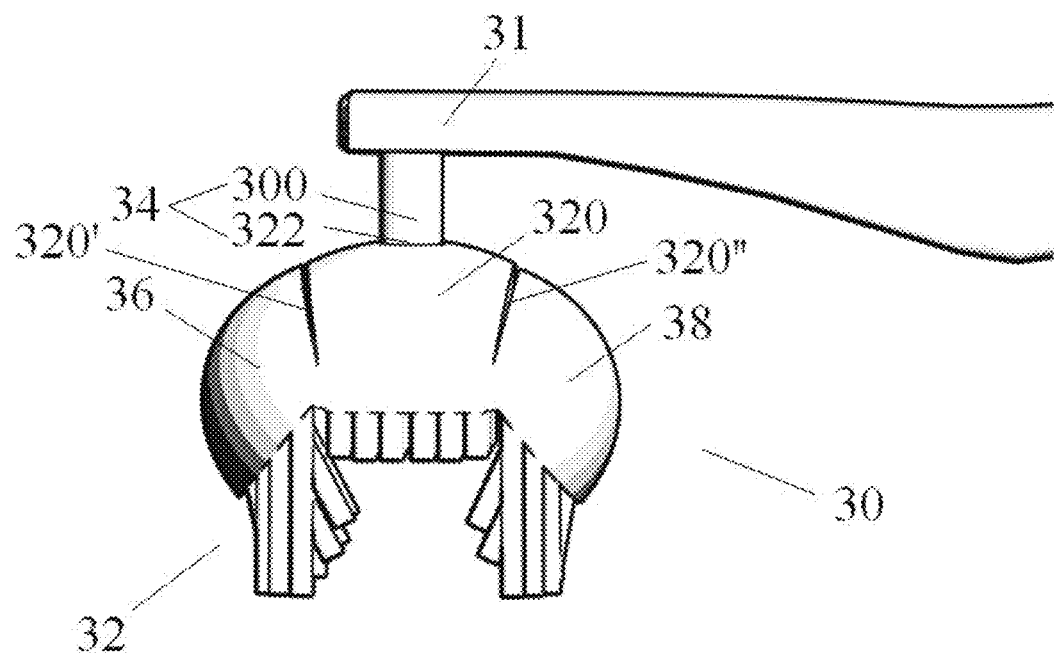
FIG. 16 is a side view of the toothbrush of FIG. 15 in an open configuration.

As illustrated in FIGS. 15-17, the toothbrush 30 of the present embodiment includes a longitudinal handle 31 with an axis, a brush head 32 with a plurality of bristles, and a coupling mechanism 34 that fastens the brush head 32 to the handle 31 such that the bristles are generally perpendicular to the axis of the handle 31, and the brush head 32 can rotate and tilt with respect to the handle 31 about an axis generally perpendicular to the handle axis. The brush head 32 in the present embodiment further includes a central bristle support portion 320 with a central bristle bundle that extends from a base surface thereof, a first bristle support portion 36 and a second bristle support portion 38 each with bristle bundles that extend from inclined surfaces thereof. The central bristle support portion 320 is disposed between the first and second bristle support portions 36, 38. The first and second bristle support portions 36, 38 are movably connected to the central bristle support portion 320 at first and second hinges 320', 320", such that when the toothbrush 30 moves along a dental arch of a user, the first bristle support portion 36 moves along the first hinge 320' to engage a buccal side of the teeth and adjacent gums, the second bristle support portion 38 moves along the second hinge 320" to engage a lingual side of the teeth and adjacent gums, and the central bristle support portion 320 moves along and engages a biting surface of the teeth.

The features and advantages of the toothbrush in the present embodiment will be more apparent from operations of different portions thereof during brushing as described below in conjunction with FIGS. 15-16.

As illustrated in FIG. 15, which is a side view of the toothbrush of the present embodiment in a closed (default) configuration, the user starts brushing his teeth by putting the toothbrush in the closed configuration at the front of the teeth, i.e. incisors. In this closed configuration, a relatively greater gap exists at the first and second hinges 320', 320", where the bristle bundles on the first and second bristle support portions 36, 38 are brought closer to each other.

Subsequently, when the toothbrush moves along a dental arch of the user, that is, in a direction from incisors towards molars, the first bristle support portion 36 moves along the first hinge 320' and towards the central bristle support portion 320 to engage a buccal side of the teeth and adjacent gums. Likewise, the second bristle support portion 38 moves along the second hinge 320" and towards the central bristle support portion 320 to engage a lingual side of the teeth and adjacent gums. The central bristle support portion 320 moves along and engages a biting surface of the teeth. During this process, the first and second bristle support portions 36, 38 are gradually pivoted outwardly at the first and second hinges 320', 320". Finally, the toothbrush will be in an open configuration when it reaches the molars, as illustrated in FIG. 16 which is a top view of a brush head of the toothbrush of the present embodiment in the open configuration. In this open configuration, the gaps at the first and second hinges 320', are relatively smaller, and the bristle bundles on the first and second bristle support portions 36, 38 are brought further way from each other, as compared with the closed configuration in FIG. 15.

Figure 17A:
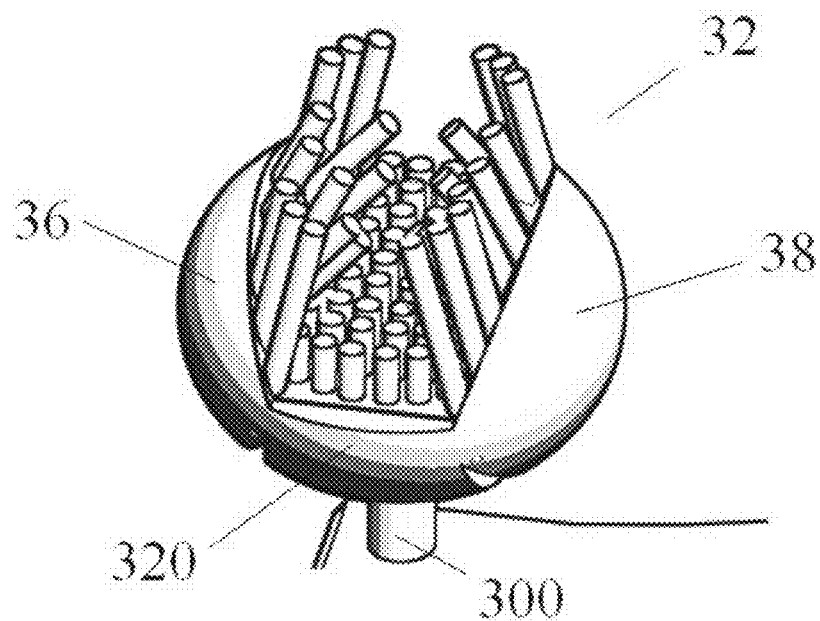
FIGS. 17A-17B are top views of the brush head in the toothbrush of FIG. 15, illustrating positioning and types of bristle bundles on the brush head, in the closed configuration and the open configuration, respectively.
Figure 17B:
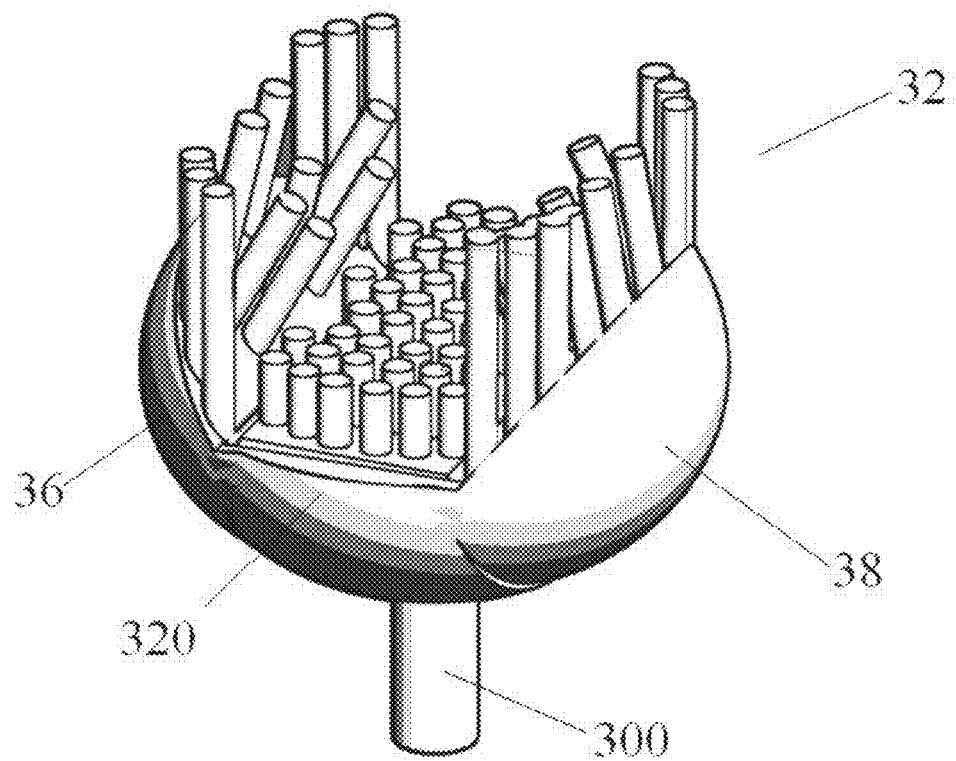

FIG. 17A and FIG. 17B show the top views of the brush head 32 in the toothbrush of the present embodiment, illustrating positioning and types of bristle bundles on the brush head 32, in the closed configuration and the open configuration, respectively. As it can be seen, the bristle bundles on the first and second bristle support portions 36, 38 are shown as being relatively longer, with different angles and/or different lengths at mirror locations; the bristle bundles on the central bristle support portion 320 are shown as being relatively shorter, with the same angle and the same length. Similar with those described with reference to FIGS. 3-5, different lengths and/or angles of the bristle bundles are intended to indicate that bristle bundles can effectively reach different parts of the teeth and gum during brushing, as described above with reference to FIGS. 15-16. Moreover, the bristle bundles on the first and second bristle support portions 36, 38 may be of different types of fibers at mirror locations, similar with those described with reference to FIGS. 3-5.

Figure 18:
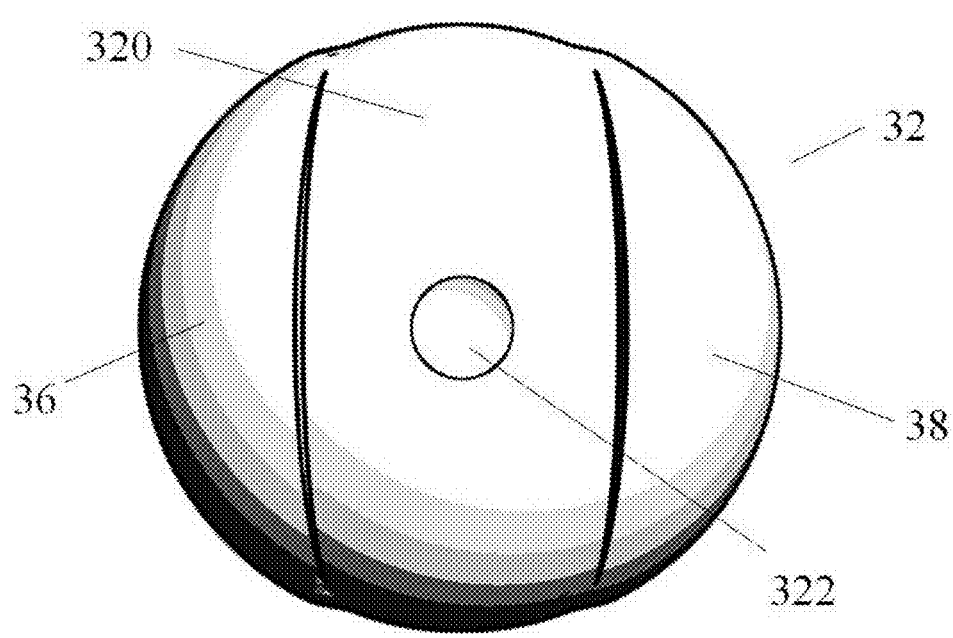
FIG. 18 is a top view of the coupling mechanism in the toothbrush of the present invention as illustrated in FIGS. 15-17, illustrating a socket on the brush head to be engaged with a connector on the handle shown in FIG. 15.

FIG. 18 provides a top view of the coupling mechanism 34 in the toothbrush of the present embodiment. The coupling mechanism 34 in the present embodiment includes: a connector 300 (not shown in FIG. 18, but in FIG. 15 instead) disposed at an end of the handle 31; and a socket 322 disposed on a top surface of the central bristle support portion 320 of the brush head 32. The connector 300 has a ball-shaped end that can be fitted into the socket 322 so that the coupling mechanism 34 is capable of causing the brush head 32 to rotate and tilt with respect to the handle 31 about an axis generally perpendicular to the handle axis.

Regardless of the brush head and the coupling mechanism used in the present embodiment, with the configurations of the first, second and central bristle support portions as well as the movable connection in a form of ball-and-socket joint between the brush head and the handle, the rotation and tilt of the brush head with respect to the handle allows the brush head to be moved along the user's dental arch from one end to the other without having to lift the toothbrush off the user's teeth.

Those skilled in the art should be appreciated that, although the present embodiment is described with reference to the case where the user starts brushing his teeth by putting the toothbrush in a default, closed configuration at the front of the teeth (as shown in FIG. 15), and where the brush head includes two bristle support portions capable of pivoting with respect to each other, the present invention is not limited thereto.

For example, a further exemplary embodiment provides a variation of the toothbrush that includes a brush head and a coupling mechanism incorporating at least part of features of the foregoing embodiments. In this exemplary embodiment, there is no specific position at which the user needs to put his toothbrush to start brushing, in contrast to the toothbrush as illustrated in FIGS. 15-18 where the user needs to put to put the toothbrush in a closed configuration at the front of the teeth to start brushing.

Figure 19:
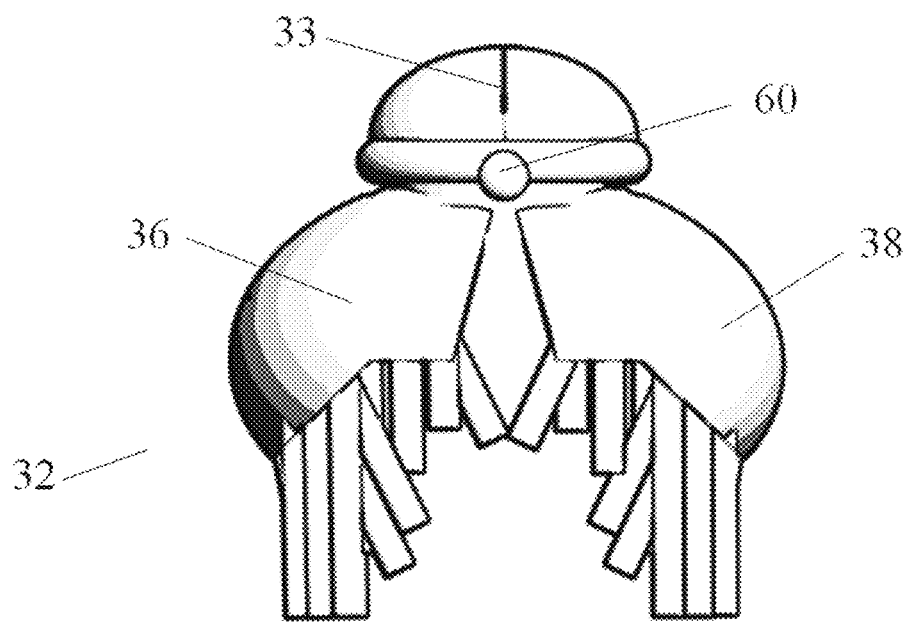
FIG. 19 is a front view of a toothbrush according to another exemplary embodiment of the present invention, in a default open configuration, which allows a user to start brushing at any position of the teeth.
Figure 20:
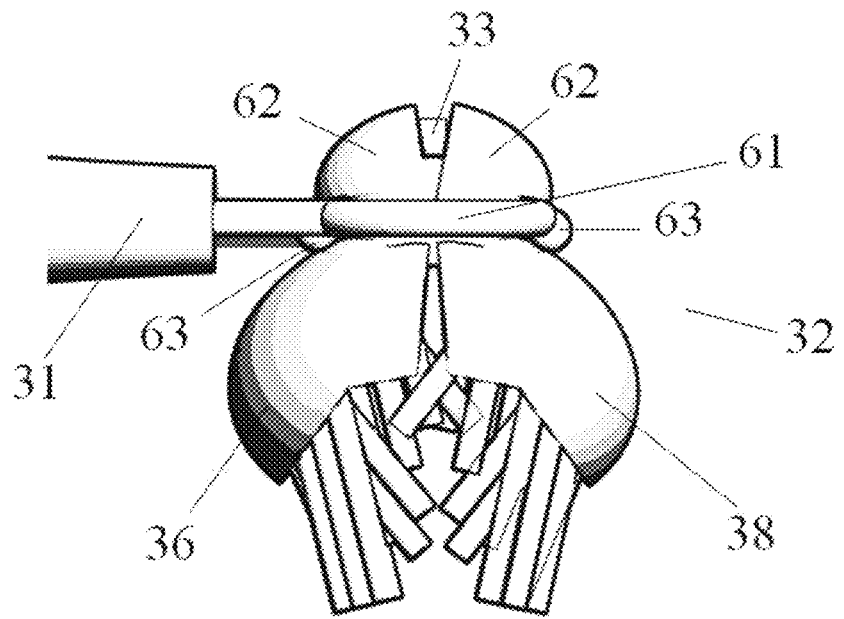
FIG. 20 is a side view of the toothbrush of FIG. 19 shifting to a closed configuration.

As illustrated in FIGS. 19-20, the toothbrush 30 of the present embodiment includes a handle 31, a brush head 32 including a first bristle support portion 36 and a second bristle support portion 38, and a coupling mechanism which causes the first and second bristle support portions 36, 38 to move toward each other, about an axle 33.

In the present embodiment, the coupling mechanism has a structure similar with that illustrated by FIGS. 10A-10B. For example, a joint 60 may be provided at the end of the handle 31 on the axle 33. This joint 60 allows the first and second bristle support portions 36 and 38 to freely rotate about the axle 33. There are ellipse-like convex surfaces 62 located on each of the first and second bristle support portions 36, 38. The convex surfaces 62 are engaged by ends 63 of clamping arms 61 that are rigidly attached to handle 31. The ends 63, by engaging varying heights of the convex surfaces 62 as the handle 31 turns with respect to the brush head 32, provides a variable force to open and close the gap between the first and second bristle support portions 36 and 38 against the force of a coil spring. The coil spring is not illustrated in FIGS. 19-20 but can be best observed in FIGS. 10A-10B by "64". It should be appreciated that, as for other structures of the coupling mechanism that omitted in the present embodiment, reference may be made to FIGS. 10A-10B which describe the coupling mechanism in more details.

Hereinafter, structures and advantages of the toothbrush in the present embodiment will be more apparent from operations of different portions thereof during brushing as described below in conjunction with FIGS. 19-20.

First of all, as illustrated in FIG. 19, the user may start brushing his teeth by putting the toothbrush in a default, open configuration at any location on the teeth. In the open configuration, the gap between the first and second bristle support portions 36 and 38 is widely open through the cooperation between the convex surfaces 62, the ends 63 and the ring 64 as described above, and the bristle bundles on the first and second bristle support portions 36, 38 are brought further away from each other so as to reach any location on the teeth.

Subsequently, as illustrated in FIG. 20, when the toothbrush moves along a dental arch of the user, the first and second bristle support portions 36 and 38 move towards each other to close the brush head 32, and the toothbrush shifts to the closed configuration. By this movement, the first bristle support portion 36 engages a buccal side of the teeth and adjacent gums, while the second bristle support portion 38 engages a lingual side of the teeth and adjacent gums.

Furthermore, similar with that described in connection with FIGS. 10A-10B, when brushing the incisor teeth, the end 63 of the clamping arm 61 of the handle 31 will meet the outer surface of the convex surfaces 62, and provide a force to close the gap between the first and second bristle support portions 36, 38 against the coil spring ring as they pivot about an axis; when brushing from the incisors to the molars, the handle 31 gradually turns to allow the first and second bristle support portions 36, 38 to gradually push outwards and allows the gap there-between to become even wider. The coil spring and the axis are not illustrated in FIGS. 19-20 but can be best observed in FIGS. 10A-10B by "64" and "66", respectively. It should be appreciated that, as for other structures of the coupling mechanism that omitted in the present embodiment, reference may be made to FIGS. 10A-10B which describe the coupling mechanism in more details.

Features of the brush head and the coupling mechanism described in the foregoing embodiments may be combined with each other to obtain additional ones, without conflict, as long as the movement of the brush head with respect to the handle allows the brush head to be moved along the user's dental arch from one end to the other without having to lift the brush off of the user's teeth.

The pilot clinical testing results show that the toothbrush in the present embodiment is more effective to get rid of the stained dental plaques from tooth surfaces, with reference to a commercially available control toothbrush. Notably, the toothbrush in the present embodiment results in a greater reduction of plaque score≥2 (Quigley Hein Index modified by Turesky et al 1970) on tooth surfaces than that made by the control toothbrush (−79.2% vs. −45.8%) in a testing subject.

While the present invention has been particularly shown and described with reference to preferred embodiments thereof; it will be understood by those skilled in the art that various changes in form and details may be made therein without departing from the spirit and scope of the invention.

What we claimed is:

1. A toothbrush comprising:
   a longitudinal handle with an axis,
   a brush head with a plurality of bristles, and
   a coupling mechanism that fastens the brush head to the handle such that the bristles are generally perpendicular to the axis of the handle and the brush head can rotate with respect to the handle about an axis generally perpendicular to the handle axis,
   wherein the brush head is in two pivotally connected portions, each with bristle bundles that extend from inclined surfaces thereof, said portions being arranged to have a gap there between that fits over the teeth of a user along the user's dental arch with one portion engaging a buccal side of the teeth and the other engaging the lingual side; and
   wherein the coupling mechanism includes a spring biasing the two brush head portions away from each other and cam surfaces for urging the two brush head portions to pivot so as to urge at least one of the two brush head portions to pivot toward the other brush head portion against the bias of the spring so as to cause the gap between the brush head portions to vary with the angle that the handle makes with the brush head.

2. The toothbrush of claim 1 wherein the coupling mechanism includes:
   a pivot point about which the two brush head portions can pivot toward or away from each other;
   a cam surface on an interior surface of the handle adjacent at least one of the brush head portions; and
   a cam surface on an exterior surface of said one of the brush head portions; and
   wherein the biasing of the spring causes the two brush head portions to form the gap there between, the movement of the handle with respect to the brush head portion causes the handle's cam surface to engage the cam surface on the one brush head portion so as to urge it to pivot toward the other brush head portion against the bias of the spring, and to reduce the gap between the brush head portions.

3. The toothbrush of claim 1 wherein the coupling mechanism includes:
   a cam pivotally connected to the handle;
   an axle from which the brush head portions are suspended, one of the brush head portions being pivotally connected to the axle so it can pivot toward or away from the other;
   a disk with a slot that rotatably and slidingly captures the axle of the brush head portions; and
   wherein the spring is at the distal end of the handle and is arranged to bias the disk toward the cam, the cam in the handle can be rotated so its outer surface pushes against the disk to move it against the bias of the spring, and linear movement of the disk causes the attached one brush head portion to pivot toward the other and close the gap between them, whereby the pivotal axle allows the brush head portions to rotate as they move along the dental arch, and the sliding of the disk causes the gap between the brush head portion to vary as needed to accommodate the different widths of the teeth along the arch.

4. The toothbrush of claim 1 wherein the coupling mechanism includes:
   an axle rotatably located in the handle, the brush head portions being suspended from the axle,
   a pivot point on the axle about which the two brush head portions can pivot toward or away from each other;
   a first cam surface on an interior surface of the handle adjacent one of the brush head portions and a second cam surface on an interior surface of the handle adjacent the other brush head portion;
   a cam surface on an exterior surface of said one brush head portion; and
   a cam surface on an exterior surface of the other brush head portion;
   wherein the biasing of the spring causes the two brush head portions to form the gap there between, movement of the handle with respect to the brush head causes the handle's first cam surface to engage the cam surface on the one brush head portion and the handle's second cam surface to engage the cam surface on the other brush head portion so as to urge the two brush head portions to pivot toward each other against the bias of the spring and to reduce the gap between them.

5. The toothbrush of claim 1 wherein the plurality of bristles are in separate bundles of uniform bristles, but wherein there are different types of bundles that have bristles that differ from bristles in other bundles by at least one of diameter, hardness, length, angulation and number; and
   wherein at least one bundle has long soft bristles directed to the distal surface of the last molar when the brush is in position over that molar.

6. The toothbrush of claim 5, wherein each brush head portion has bundles with first short hard bristles directed from the head portion to the highest point on the occlusal surface of the teeth, second short hard bristles that are longer than the first short hard bristles and are directed from the head portion to the edge of the occlusal surface of the teeth, third short hard bristles that are longer than the second short hard bristles and are angled from the head portion to the depression in the occlusal surface of the teeth, medium length hard bristles that are longer than the third short hard bristles and are directed from the head portion to the buccal/lingual surfaces of the teeth, long soft bristles that are longer than the medium length hard bristles and more numerous in the bundle, and which are directed to the gingival sulcus, and longest soft bristles that are longer than the long soft bristles, some of which are directed to the gums and some of which are directed to the distal surface of the last molar when in position over that molar.

7. The toothbrush of claim 6 wherein the hard bundles have 20 bristles and the soft bundles have 30 bristles.

8. The toothbrush of claim 1 further including an ultrasonic vibrator in the handle which causes the brush head to vibrate.

9. The toothbrush of claim 8 wherein the vibrator causes the bristles to vibrate at up to about 3,000 vibrations per second and the total number of bristles is up to about 1,000.

10. The toothbrush of claim 1 wherein the rotation of the brush head with respect to the handle is such that the brush head can be moved along the user's dental arch from one end to the other without having to lift the brush off of the user's teeth.

11. A toothbrush comprising:
    a longitudinal handle with an axis,
    a brush head with a plurality of bristles, and
    a coupling mechanism that fastens the brush head to the handle such that the bristles are generally perpendicular to the axis of the handle and the brush head can rotate and tilt with respect to the handle about an axis generally perpendicular to the handle axis, wherein the brush head is formed by a flexible material and includes first and second bristle support portions, each with bristle bundles that extend from inclined surfaces thereof, and a central bristle support portion with a central bristle bundle that extends from a base surface thereof, disposed between the first and second bristle support portions, wherein the first and second bristle support portions movably connects to the central bristle support portion at first and second hinges, such that when the toothbrush moves along a dental arch of a user, the first bristle support portion moves along the first hinge to engage a buccal side of the teeth and adjacent gums, the second bristle support portion moves along the second hinge to engage a lingual side of the teeth and adjacent gums, and the central bristle support portion moves along and engage a biting surface of the teeth; and wherein the coupling mechanism includes a spring biasing the two brush head portions away from each other and cam surfaces for urging the two brush head portions to pivot so as to urge at least one of the two brush head portions to pivot toward the other brush head portion against the bias of the spring so as to cause the gap between the brush head portions to vary with the angle that the handle makes with the brush head.

12. The toothbrush of claim 11, wherein the plurality of bristles are in separate bundles of uniform bristles, but wherein there are different types of bundles that have bristles that differ from bristles in other bundles by at least one of diameter, hardness, length, angulation and number; and wherein at least one bundle has long soft bristles directed to the distal surface of the last molar when the brush is in position over that molar.

13. The toothbrush of claim 12, wherein each of the first and second bristle support portions has bristle bundles with first short hard bristles directed from the head portion to the highest point on the occlusal surface of the teeth, second short hard bristles that are longer than the first short hard bristles and are directed from the head portion to the edge of the occlusal surface of the teeth, third short hard bristles that are longer than the second short hard bristles and are angled from the head portion to the depression in the occlusal surface of the teeth, medium length hard bristles that are longer than the third short hard bristles and are directed from the head portion to the buccal/lingual surfaces of the teeth, long soft bristles that are longer than the medium length hard bristles and more numerous in the bundle, and which are directed to the gingival sulcus, and longest soft bristles that are longer than the long soft bristles some of which are directed to the gums and some of which are directed to the distal surface of the last molar when in position over that molar.

14. The toothbrush of claim 13, wherein the hard bundles have 20 bristles and the soft bundles have 30 bristles.

15. The toothbrush of claim 11, further including an ultrasonic vibrator in the handle which causes the brush head to vibrate.

16. The toothbrush of claim 15, wherein the vibrator causes the bristles to vibrate at up to about 3,000 vibrations per second and the total number of bristles is up to about 1,000.

17. The toothbrush of claim 11, wherein the rotation of the brush head with respect to the handle is such that the brush head can be moved along the user's dental arch from one end to the other without having to lift the brush off of the user's teeth.

18. The toothbrush of claim 11, wherein the coupling mechanism further comprises:

a connector disposed at an end of the handle; and a socket disposed on a top surface of the central bristle support portion of the brush head, and wherein the connector has a ball-shaped end which is configured to be fitted into the socket.

* * * * *